United States Patent [19]

Robins

[11] 4,226,275

[45] Oct. 7, 1980

[54] TIRE BEAD BREAKING APPARATUS

[76] Inventor: Robert R. Robins, 721 N. Woodland, Minneapolis, Kans. 67467

[21] Appl. No.: 8,018

[22] Filed: Jan. 31, 1979

[51] Int. Cl.³ .............................................. B60C 25/06
[52] U.S. Cl. ................................................. 157/1.2
[58] Field of Search ..................... 157/1.17, 1.2, 1.26, 157/1.28

[56] References Cited

U.S. PATENT DOCUMENTS

| | | | |
|---|---|---|---|
| 2,537,041 | 1/1951 | Finch | 157/1.2 |
| 2,842,191 | 7/1958 | Coats | 157/1.26 |
| 3,033,268 | 5/1962 | Schaevitz | 157/1.26 |
| 3,630,260 | 12/1971 | Bailey | 157/1.26 |
| 3,865,172 | 2/1975 | Branick | 157/1.26 |
| 3,867,975 | 2/1975 | Johnson | 157/1.2 |
| 3,905,413 | 9/1975 | Myers | 157/1.26 X |
| 3,958,618 | 5/1976 | Reuther | 157/1.2 |
| 3,972,363 | 8/1976 | West et al. | 157/1.26 |

*Primary Examiner*—James G. Smith
*Attorney, Agent, or Firm*—Robert K. Rhea

[57] ABSTRACT

An upright rigid open frame surrounds a wheel rim mounted tire when disposed therein. One side of the frame supports a pressure cylinder projecting laterally of the frame with its longitudinal axis normal to the plane of the opposite side of the frame. That side of the frame opposite the pressure cylinder forms a backstop for the rim and tire. An endless cylindrical ring, coaxially supported by the pressure cylinder piston rod, is moved toward and away from the tire side wall adjacent the periphery of the rim tire bead flange. A rim and tire supporting platform, hingedly connected with the frame base portion, is vertically adjustable for coaxially aligning of the rim with the pressure cylinder.

3 Claims, 5 Drawing Figures

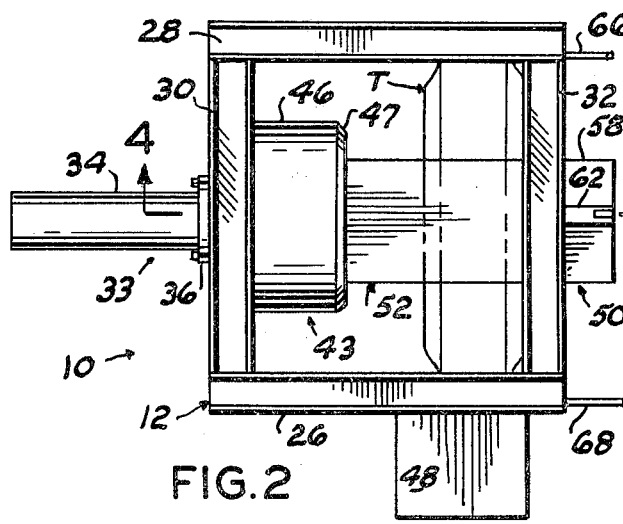
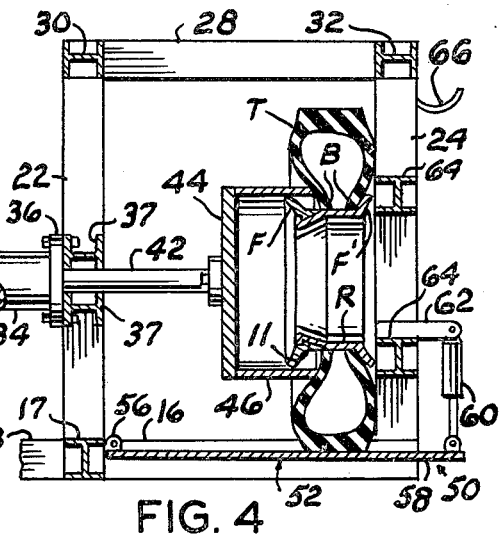
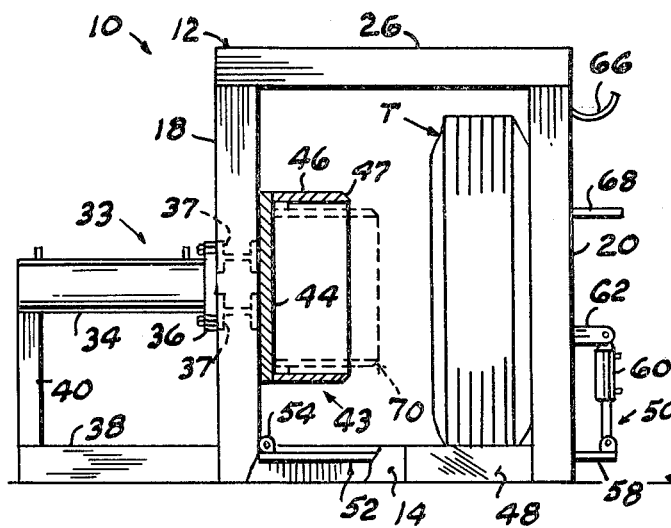
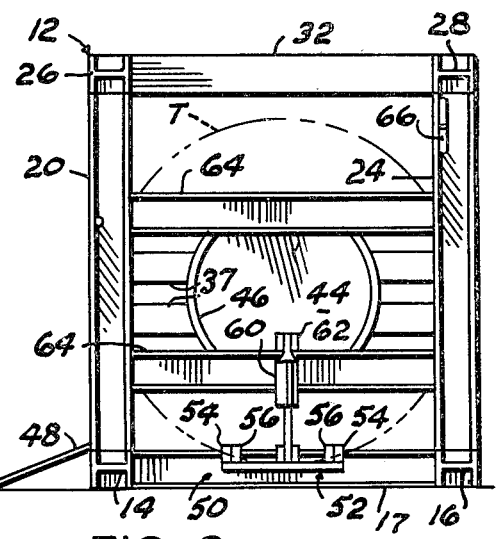
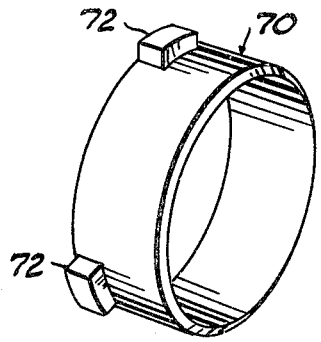

TIRE BEAD BREAKING APPARATUS

BACKGROUND OF THE INVENTION

1. Field of the invention.

The present invention relates to tire dismounting apparatus and more particularly to a device for unseating the bead of a pneumatic tire.

Large size tires and wheel rims, such as those presently used on transport trucks, and the like, because of their size and mass are difficult to handle and remove the tire from the metal wheel rim. The side walls of the tire at their interior margins have beads, which tightly embrace cooperating bead seats formed on or forming a part of the rim. After the tire has been in use even for a short period of time these seals are extremely difficult to break.

2. Description of the prior art.

Tire changing machines or apparatus presently in use are generally designed for passenger car size wheels, such as U.S. Pat. Nos. 2,842,191 and 3,905,413, and on account of the mass of large size truck tires are not adaptable for use in dismounting such truck tires. Another U.S. Pat. No. 3,033,268, discloses an apparatus for holding a truck tire and wheel and rotating it about its axis which includes a shoe movable toward and away from a relatively small arc of the tire side wall adjacent the wheel rim for progressively breaking the tire bead seal. Still another U.S. Pat. No. 3,865,172 discloses an apparatus for breaking the bead of relatively large size tires, such as are used on earth movers, in which a tire bead breaking finger is power driven against the tire bead at one side of the tire with an identical finger on the opposite tire bead serving as a backstop.

The principal disadvantage of apparatus, such as disclosed by these patents for progressively breaking the tire bead, resides in the tire bead being moved toward a resealing position on the bead seat when the bead breaking members are moved to another position adjacent the wheel rim and near the previously loosened tire bead area. Other giant size tire bead breaking apparatus is disclosed by U.S. Pat. No. 3,972,363 which discloses an overhead track assembly for supporting a hoist for handling the tire and wheel and manually positioning circumferentially spaced tire side wall engaging members subsequently moved against the tire side wall by a pressure cylinder connected therewith by having its piston rod extending through the wheel center and between backing members.

This invention is an improvement over the prior art by providing a rigid open frame into which a wheel rim mounted truck tire, or the like, may be rolled and supported against lateral movement and in which a pressure cylinder, coaxial with the tire and wheel, moves a tire side wall engaging endless ring toward the tire side wall for unseating the tire bead.

SUMMARY OF THE INVENTION

An upright rigid open framework is provided with a ramp for manually rolling a wheel rim mounted truck tire, or the like, into the frame and be disposed adjacent the inner surface of one of its sides. A pressure cylinder, horizontally supported by the opposite side of the frame, has its piston rod connected with an endless ring movable toward and away from the tire side wall adjacent the periphery of the rim flange for unseating the adjacent tire bead from its seat. The tire and rim is supported within the frame by a platform hingedly connected, at one end portion, with the frame base portion and vertically adjustable, at its other end portion, for disposing the tire and rim coaxial with respect to the pressure cylinder piston rod.

The principal object of this invention is to provide a tire changing apparatus for breaking the tire bead of large size tires, such as truck tires, which is easily and safely operated by a single workman without requiring the use of special tools.

BRIEF DESCRIPTION OF THE DRAWINGS

FIG. 1 is an end elevational view of the device with parts broken away for clarity and illustrating, by dotted lines, a smaller diameter tire bead engaging bushing;

FIG. 2 is a top view of FIG. 1;

FIG. 3 is a right side view of FIG. 1;

FIG. 4 is a fragmentary vertical cross sectional view taken substantially along the line 4—4 of FIG. 2; and, FIG. 5 is a perspective view of one smaller diameter tire bead engaging bushing.

DESCRIPTION OF THE PREFERRED EMBODIMENT

Like characters of reference designate like parts in those figures of the drawings in which they occur.

In the drawings:

The reference numeral 10 indicates an apparatus for removing a tire T from the wheel rim R on which the tire is mounted by breaking the tire beads B away from the bead seat forming rim flanges F and F'. In the example illustrated, the rim flange F is a split ring seated in a cooperating groove 11 formed in one end portion of the rim R. The split ring flange F is removed from the rim after unseating the adjacent tire bead.

The apparatus 10 is generally box-like in overall configuration comprising an open framework 12 preferably formed by rigidly connected elongated beams, such as I-beams. The overall dimensions of the frame 12 is such that it loosely surrounds the largest size tire and rim to be dismounted. The framework beams include a pair of base members 14-16 interconnected at one end by a base member 17. Four upstanding corner members 18-20 and 22-24 are joined at their upper ends by upper end members 26-28 and side members 30-32.

Ram means 33 is supported by the frame 12 and includes a first or main horizontally disposed pressure cylinder, such as a hydraulic cylinder 34, having its flanged end 36 secured to cross braces 37 extending between the corner posts 18 and 20. The opposite end of the cylinder is supported by a base member extension 38 and a standard 40. The hydraulic cylinder piston rod 42 is coaxially connected with endless ring means 43 including a disk 44. The diameter of the disk 44 is preferably slightly greater than the outside diameter of the rim flange F for the purposes presently apparent.

The peripheral edge portion of the disk 44 is connected with one end of a cylindrical ring member 46 having an inside diameter slightly greater than the outside diameter of the largest size tire rim to be surrounded. The outer peripheral edge surface of the ring at its end opposite the disk 44 is preferably tapered or beveled inwardly in converging relation toward the flange F, as at 47. The taper 47 is for the purposes of narrowing the wall thickness of the ring 46 without forming a sharp or cutting edge when the ring engages the tire side wall as presently explained.

The frame 12 is further provided with a generally rectangular ramp 48 at one or both of its ends for manually rolling the rim mounted tire T into the frame.

A platform means 50 supports the tire and rim within the frame and comprises an elongated generally planar plate 52, having a length greater than the width of the frame, hingedly connected at one end to the base member 17 by pairs of ears 54-56, respectively, connected with the plate 52 and base member 17 for vertical pivoting movement of the plate other end portion 58 about the axis of the hinged connection. A second smaller hydraulic cylinder 60 extends between and is connected with the plate end portion 58 and an arm 62 secured to the lowermost one of a pair of cross brace members 64 extending in horizontal vertically spaced relation between the frame posts 20 and 24. The cross members 64 form a backstop in the plane of the frame side opposite the ram means 33. The tire T and rim R are positioned within the frame adjacent the backstop members 64.

A pair of rod-like members 66 and 68 are secured to the backstop side of the frame for supporting inner tubes, tools or air pressure supply hose, not shown.

Since the tire bead engaging ring 46 is dimensioned for the size truck rim and tires it is intended to be used with, it seems obvious that for versatility additional smaller diameter rings are necessary for unseating the beads of smaller size rims or wheels and tires. This is accomplished by providing a plurality of bushing-type cylindrical rings 70, only one being shown (FIG. 5). Except for its diameter the ring 70 is substantially identical with respect to the ring 46 and is provided on its periphery, adjacent its end opposite the beveled surface, with a plurality, only two being shown, of rigidly connected spacers 72 to compensate for the annular spacing between the circumference of the ring 70 and the inside surface of the piston rod connected ring 46. The ring 70 is coaxially received by the ring 46 with the spacers 72 disposed adjacent the disk 44.

Obviously, the pressure cylinders 34 and 60 are connected in a conventional manner with a hydraulic fluid pressure supply through conventional control valve means, neither of which are shown.

OPERATION

In operation, assuming the tire and/or inner tube, not shown, is deflated, the rim and the tire T is manually rolled up the ramp 48 and into the frame 12 and supported by the platform means 50. The rim and tire are disposed adjacent and parallel with the backstop forming cross braces 64. The platform means 50 is adjusted by the hydraulic cylinder 60 so that the rim and tire are substantially in coaxial alignment with respect to the longitudinal axis of the first hydraulic cylinder piston rod 42. The hydraulic cylinder 34 is actuated to extend its piston rod and move the bead unseating ring 46 into contact with the side wall of the tire T adjacent the periphery of the adjacent rim flange F with pressure being applied to the tire side wall by the beveled edge of the ring 46 until the tire bead seal is broken or released from its seat and the tire substantially assumes the position illustrated by FIG. 4. The piston rod 42 and ring 46 are then retracted and the tire and rim are reversed in the frame by rolling the tire out and back into the frame after reversing the position of the tire and rim so that the above action may be repeated for unseating the tire bead from the rim flange F'. Thereafter, the tire and rim are removed from the frame and the tire repaired or replaced as required.

Obviously the invention is susceptible to changes or alterations without defeating its practicability. Therefore, I do not wish to be confined to the preferred embodiment shown in the drawings and described herein.

I claim:

1. A machine for breaking the beads on the side wall of a tire away from bead seats on a rim having annular outwardly projecting flanges at its ends forming the bead seats and restraining the side walls, said machine comprising:

an upright open frame capable of loosely surrounding a rim mounted tire when vertically positioned therein, one side of said frame having cross members forming a backstop in the plane of said one side against which the tire and rim are disposed;

ram means supported by the side of said frame opposite said one side for movement toward and away from said backstop;

adjustable platform means underlying said tire and rim for coaxially aligning said rim with an endless ring means, said platform means including an elongated plate hingedly connected, at one end portion, with a base portion of said frame below said ram means and projecting, at its other end portion, beyond said one frame side in underlying relation with respect to said backstop forming cross members, and, a hydraulic cylinder pivotally connecting said plate other end portion with one said cross member for vertically moving said plate other end portion toward and away from said cross members; and, said endless ring means supported by said ram means for coaxially engaging the adjacent side wall of said tire in close spaced circumferential relation with respect to the periphery of the rim flange.

2. The machine according to claim 1 and further including: inclined ramp means connected with said frame for rolling a rim mounted tire into said frame.

3. The machine according to claim 2 and further including:

a cylindrical bushing coaxially received by said cylindrical ring and projecting at one end portion beyond said cylindrical ring toward said backstop.

* * * * *